United States Patent [19]

Kim

[11] 4,340,342
[45] Jul. 20, 1982

[54] APPARATUS FOR PROCESSING ELASTOMERIC MATERIALS

[75] Inventor: Heung T. Kim, Avon Lake, Ohio

[73] Assignee: The B. F. Goodrich Company, Akron, Ohio

[21] Appl. No.: 225,498

[22] Filed: Jan. 16, 1981

[51] Int. Cl.³ ............................................. B29C 17/10
[52] U.S. Cl. ................................. 425/72 R; 264/555;
264/118; 264/143; 264/144; 425/202; 425/294;
425/296; 425/299; 425/307; 425/313; 425/316
[58] Field of Search ....... 264/147, 143, 140, DIG. 47,
264/144, 118, 555; 425/294, 296, 299, 307, 313,
316, 72 R, 202

[56] References Cited

U.S. PATENT DOCUMENTS

| | | | |
|---|---|---|---|
| 2,601,200 | 6/1952 | Amos et al. ........................... | 264/140 |
| 3,076,999 | 2/1963 | Washburn ............................ | 425/316 |
| 3,140,511 | 7/1964 | Seufert et al. ....................... | 425/316 |
| 3,250,834 | 5/1966 | Collins ................................. | 264/143 |
| 3,339,233 | 9/1967 | Woitzel et al. ...................... | 425/307 |
| 3,527,393 | 9/1970 | Matsui et al. ............... | 264/DIG. 47 |
| 3,634,570 | 1/1972 | Himelreich, Jr. et al. ......... | 264/143 |
| 3,859,407 | 1/1975 | Blanding et al. .................... | 264/140 |
| 3,988,401 | 10/1976 | Kasting et al. ..................... | 264/140 |
| 4,045,151 | 8/1977 | Zazzara ............................... | 425/307 |

FOREIGN PATENT DOCUMENTS 251729  1/1961  Australia ............................ 264/140

Primary Examiner—Jeffery R. Thurlow
Attorney, Agent, or Firm—Joseph Januszkiewicz

[57] ABSTRACT

The processing of thermoplastic materials by working the thermoplastic materials into a hot flat sheet. The sheet material is first deformed or scored into a series of parallel strands that are interconnected by thin ribbons of the thermoplastic material thereby retaining integrity of the sheet material. The sheet material is then severed along the score line of the thin ribbons to form parallel strands which are cooled and guided to a fly cutter which cubes the strand material.

5 Claims, 12 Drawing Figures

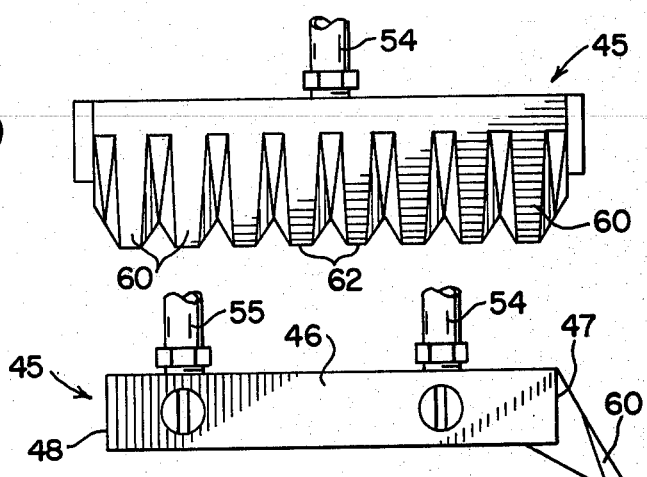
FIG. 9
FIG. 10
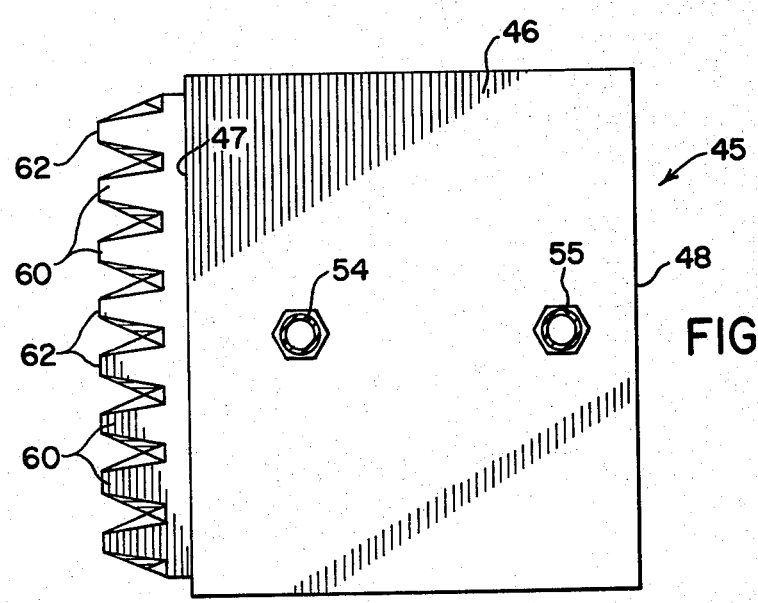
FIG. 11
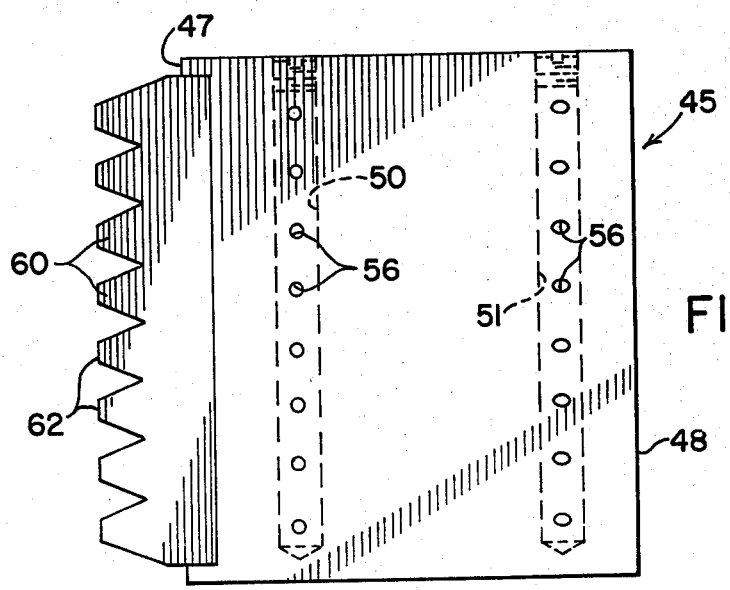
FIG. 12

APPARATUS FOR PROCESSING ELASTOMERIC MATERIALS

BACKGROUND OF THE INVENTION

This invention relates to a new and improved apparatus for cubing of thermoplastic material in preparation for use of such materials in further operations.

In the manufacture of thermosetting and thermoplastic materials in the extrusion processes, it is important to provide consistency in the raw material. The extrusion process may receive the raw materials and premix the component elements or receive the raw materials premixed and ready for use such as cubed materials. To many, the latter is preferably as the consistency of initial product for the extruder can be better controlled by manufacturing specialists who blend the PVC resin with plasticizer, stabilizers, and other additives. In preparing the PVC resin for use by such operators the manufacture cubes or dices the thermoplastic materials for bagging and subsequent shipment. It has been the practice to dice cold sheet or milled sheet material from the blenders. Diced PVC is generally of a cube size of ⅛ and 3/32 inch. Most dicing or cubing machines receive the thermoplastic material as it comes from a cooling bath or a spray cooling system. The dicer has a plurality of rotor knives that cooperate with a bed knife. The teeth of the rotor knives are so proportioned in relation to the bed knife that the severing action produces cubes. Variations on this equipment has been tried to speed up the cubing process.

A variation on the above process of dicing has been to use a slitter-chopper arrangement, where the thermoplastic material is cut into multiple strands, afterwhich the strands are fed into a separate machine which are crosscut into cubes by rotor knives against a bed knife as the strands are drawn therebetween. The drawback with a slitter-chopper is that cutting hardened plastics causes a wearing problem on blades and subsequently worn blades result in irregularly shaped cubes. Further, such operation generates dust and noise.

The present invention is directed to a new and improved cuber that operates on a hot strip of thermoplastic material eliminating considerable dust, reducing the energy consumption while increasing the output rate of a slitter-chopper type of apparatus.

SUMMARY OF THE INVENTION

The present invention is directed to a process and apparatus for cubing thermoplastic materials. The invention includes a mill or other means operative to work hot thermoplastic material into a hot flat sheet. Such sheet is conveyed to a pair of cooperative rollers which deform the flat sheet into an undulating sheet which has parallel strands interconnected by thin ribbons of thermoplastic material. The ribbon material is severed to provide a plurality of parallel strands. Deflector means are used to cool and guide the strands to a take off roll which directs the strands to a cutting device which dices or cubes the strands.

BRIEF DESCRIPTION OF THE DRAWINGS

FIG. 9 is a front elevational view of a deflector apparatus.

FIG. 10 is a side elevational view of the deflector apparatus.

FIG. 11 is a plan view of the deflector apparatus.

FIG. 12 is a view of the bottom portion of the deflector apparatus.

DETAILED DESCRIPTION

Figure 1:
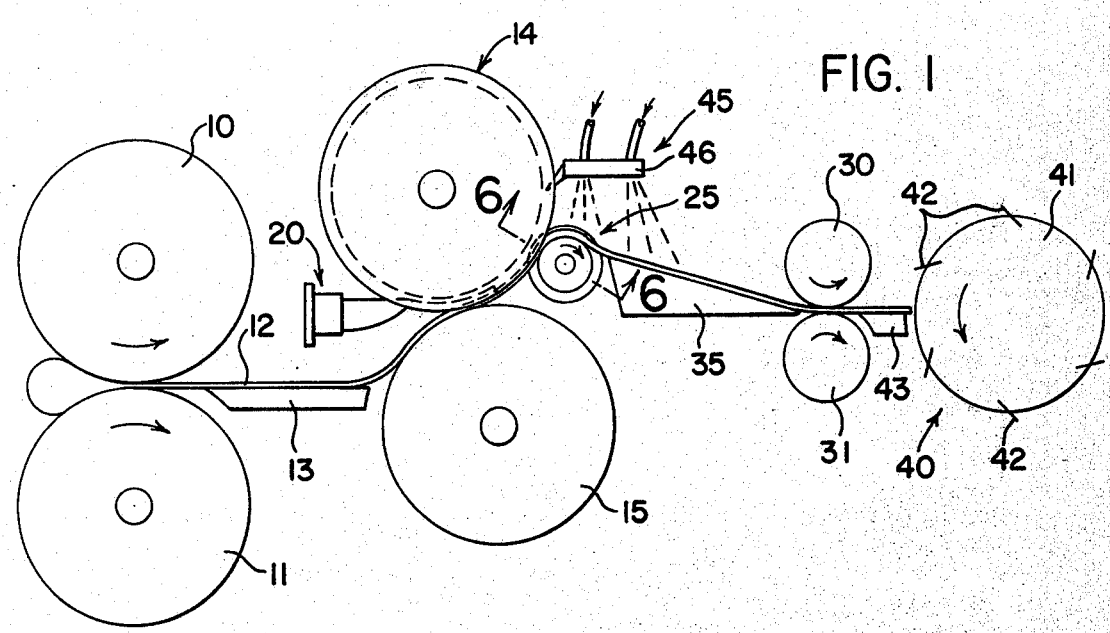
FIG. 1 is a schemmatic side elevational view of the cubing system.
Figure 2:
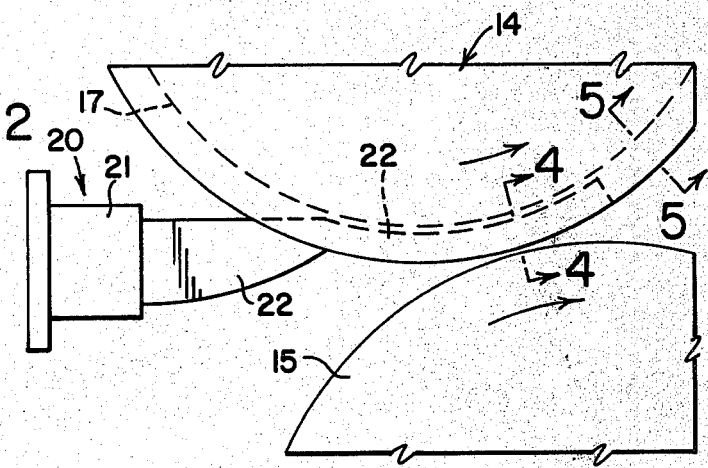
FIG. 2 is an enlarged fragmentary side elevational view of a portion of slitting-type of apparatus.
Figure 3:
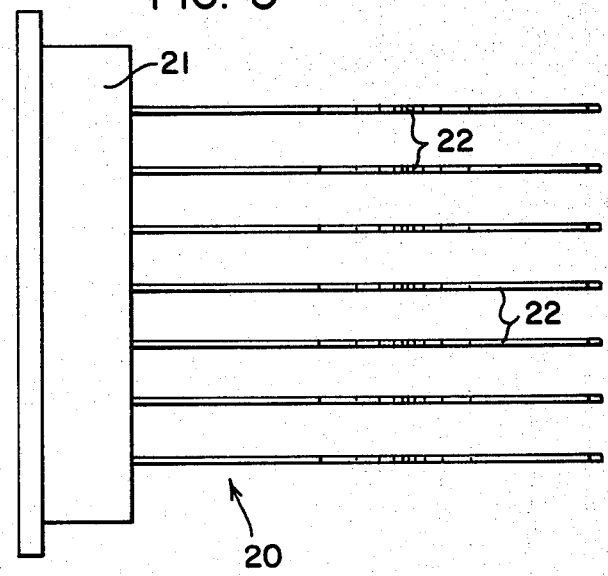
FIG. 3 is an enlarged plan view of a guide member showing a plurality of laterally spaced filler members.
Figure 4:
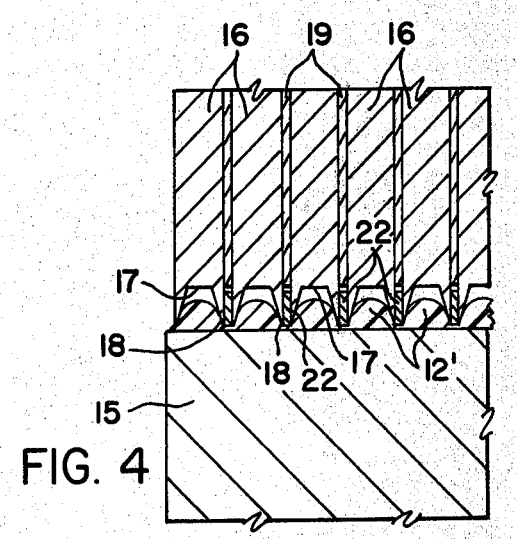
FIG. 4 is a fragmentary cross sectional view taken along lines 4—4 of FIG. 2 showing a portion of a pair of cooperative deforming rollers.

Referring to the drawings, wherein like reference numerals designate like or corresponding parts throughout the several views, there is shown in FIG. 1 a pair of mill rolls 10 and 11 suitably powered to masticate and form a thin sheet of thermoplastic material 12. Material 12 is guided by a suitable plate member 13 for directing the sheet material to a pair of cooperative deforming mill rolls 14 and 15 driven by a motive means old and well known in the art. Roll 15 has a smooth cylindrical surface. Roll 14 has a plurality of axially aligned cutters 16 suitably keyed thereto for rotation therewith. Each cutter 16 has a recess 17 thereby providing a pair of spaced cylindrical cutting edges 18. Cylindrical washers 19 are received between the respective cutters 16. As seen in FIG. 4 the respective recesses 17 in cross section are trapeziodal in shape.

A guide member 20 is located suitably adjacent to rolls 14 and 15. Guide member 20 has a cross support 21 from which extend a plurality of laterally spaced fingers or filler members 22. The filler members 22 are arcuate shaped in cross section and are received by the peripheral portion of mill roll 14 that is adjacent to the bite portion between rolls 14 and 15. The respective outer ends of the filler members extend into the clearance space between adjacent cutters 16. Such guide member 20 with its filler members 22 act as spaced guides to direct the thermoplastic material 12 into the recesses 17 of the cutters 16 to facilitate the formation of the undulating portions 12' with a thin ribbon portion interconnecting such undulating portions 12'.

Mounted adjacent to roll 14 circumferentially downstream of the bite portion of rolls 14 and 15 is a slitter 25. Slitter 25 comprises a shaft 26 on which are mounted a plurality of axially spaced circular cutters 27. Shaft 26 is suitably rotated by a motor not shown. The cutters 27 are aligned with the clearance spaces between the cutters 16 such that the cutters 27 will sever the thin ribbon strip that interconnects the large undulating portions 12' of the thermoplastic material.

A pair of take up rolls 30 and 31 are mounted on a suitable support rearward of the slitter 25. Mounted between the slitter 25 and the pair of take up rolls 30 and 31 is a chute 35 or other suitable conveying means for advancing the strand material to the take up rolls 30 and 31 for feeding to a cutter or cubing means 40. Cutter means 40 includes a roll 41 having a plurality of circumferentially spaced cutter blades 42 cooperative with a stationary blade or bed knife 43.

Mounted adjacent to roll 14 and slitter 25 is a diverter 45 having a generally rectangular support 46 with a front edge 47 and a rear edge 48. Support 46 has a pair of passageways 50 and 51 extending laterally therethrough. A pair of threaded spaced bores 52 and 53 extend from the upper outer surface of support 46 into passageways 50 and 51 respectively. Threadedly connected to the respective bores 52 and 53 are supply conduits 54 and 55. A plurality of spaced apertures or openings 56 extend from the lower surface of support 46 into passageway 50 and 51, such that pressurized coolant air or a mixture of pressurized coolant air and water as a mist is conducted from a suitable supply source via conduits 54 and 55 to passageways 50 and 51 for application as a jet spray onto the strand material 12'. A plurality of laterally spaced projections or fingers 60 are mounted on the front portion of support 46, which projections 60 taper downward to a flat linear edge 62. Such projections 62 project into the respective recesses 17 in the cutters 16 to deflect any strand material downwardly towards the chute 35 and the take away rolls 30 and 31 worked by a pair of cooperative mill rolls.

Figure 7:
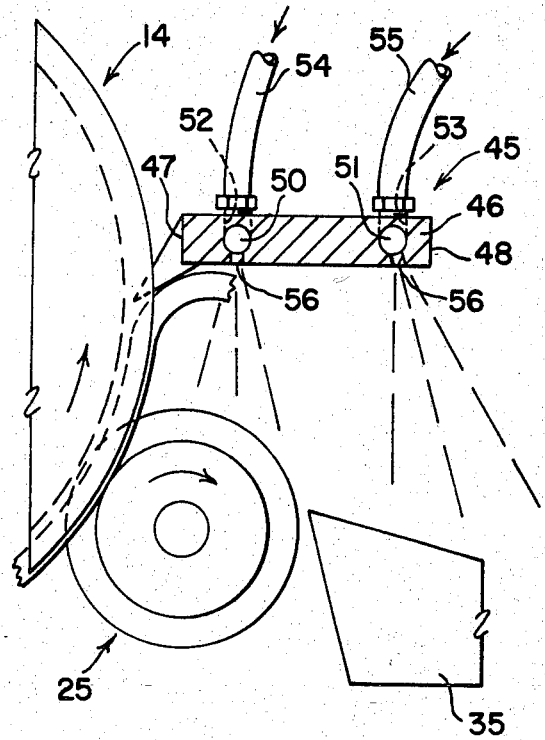
FIG. 7 is a side elevational view of a portion of the slitting apparatus showing a deflector apparatus.
Figure 8:
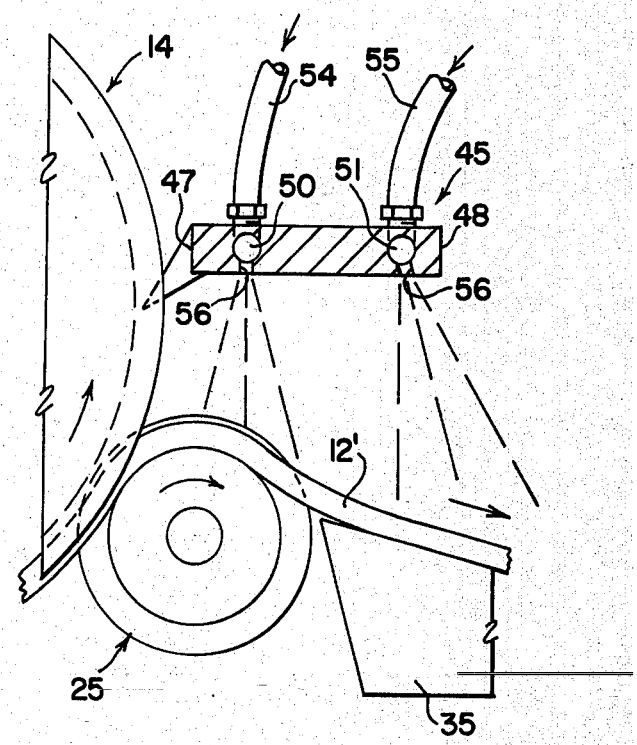
FIG. 8 is a side elevational view of a portion of the slitting apparatus showing the deflector apparatus and the flow of a thermoplastic sheet.
Figure 5:
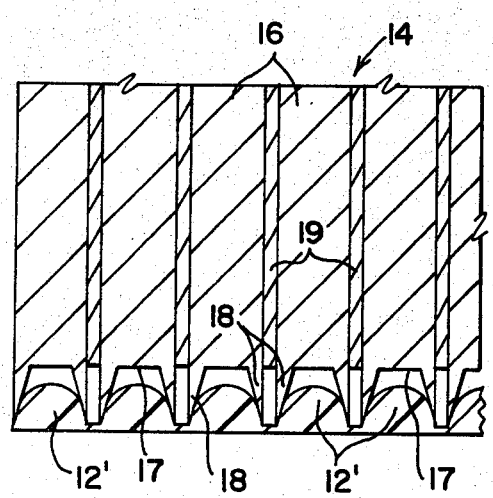
FIG. 5 is a fragmentary cross sectional view taken on lines 5—5 of FIG. 2 showing one of the deforming rollers.
Figure 6:
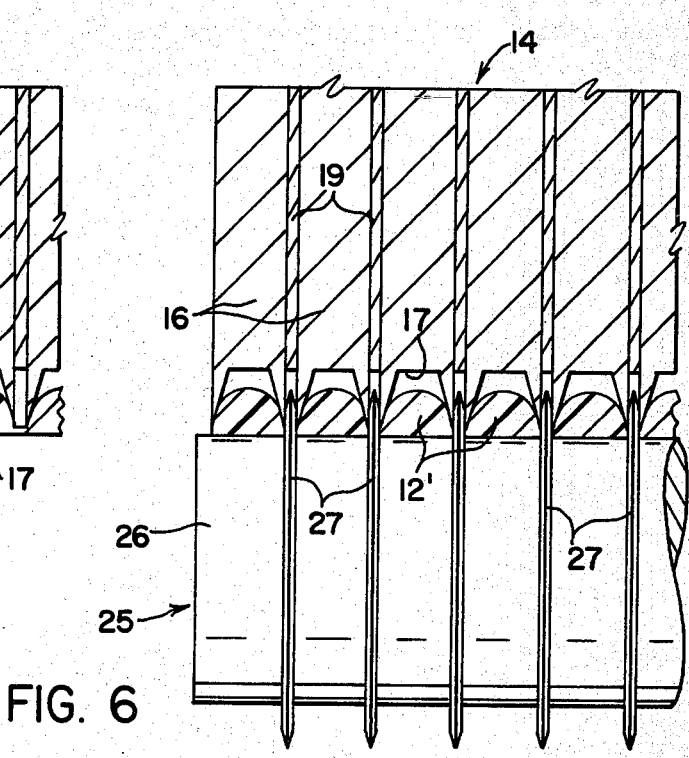
FIG. 6 is a fragmentary cross sectional view taken along lines 6—6 of FIG. 1 showing a slitting cutter cooperative with one deforming roller.

In the operation of the above discribed, thermoplastic material is worked by the pair of cooperative mill rolls 10 and 11 whereby a thin sheet of hot thermoplastic material 12 is directed to the cubing apparatus. As the hot thermoplastic material 12 enters the bite of the mill rolls 14 and 15, deforming mill roll 14 deforms and squeezes the hot material into the recesses 17 forming an undulating sheet that in effect is scored, creating a plurality of longitudinally extending strands interconnected along the edges by a thin ribbon as depicted by FIG. 5. To assure the flow of the hot thermoplastic material into this form, guide member 20 with its laterally spaced fingers or filler members 22 fill the clearance space between the axially aligned cutters 16 to divert the thermoplastic material to the recesses 17 (FIG. 4). As the thermoplastic material moves around in the recesses 17 along with the rotation of mill roll 14 the undulating sheet is cut by the rotating slitter 25 into the individual strands along the edges of the ribbon that interconnects the plural strands. The strands of thermoplastic material tend to rotate arcuately with such strands encountering the leading edges of the laterally spaced fingers 60 of diverter 45 which deflect the undulating sheet downwardly towards chute 35 as depicted by FIG. 7. To facilitate such movement of the strands, air blasts or an air spray containing a mist impinges on the upper surfaces of the strands from the bores located on the lower surfaces of the diverter 45. The strands 12' are fed by the take up rolls 30 and 31 to the dicer or cuber 40 wherein the rotating blades 42 cooperate with the bed knife 43 to sever the strands into cubes or pellets for subsequent bagging.

Various modifications are contemplated and may be resorted to by those skilled in the art without departing from the described invention, as hereinafter defined by the appended claims as only a preferred embodiment thereof has been disclosed.

I claim:

1. An apparatus for the cubing of thermoplastic materials having support means, a pair of rolls mounted on said support means, one of said rolls having a plurality of spaced formers cooperative with said other roll to form an undulating sheet having parallel strands interconnected by laterally extending and longitudinally extending thin web portions from a uniform thickness sheet of hot material passing therebetween, slitting means mounted on said support means and cooperative with said one roll to slit said undulating shapes along said longitudinally extending web portions into longitudinally extending strands, a cube cutter means mounted downstream of said pair of rolls for cutting said laterally extending webs of said plural strands into individual cubes, and cooling means mounted between said cube cutter and said slitting means for cooling said strands.

2. An apparatus for cubing as set forth in claim 1 wherein said spaced formers comprise a plurality of axially spaced cylindrical cutting discs with clearance space therebetween, and a plurality of laterally spaced guides extending into said clearance spaces to facilitate the forming of said undulating sheet.

3. An apparatus for cubing as set forth in claim 2 wherein said one roller has a diverter cooperative therewith to facilitate said guiding of strand material from said slitting means toward said cube cutter means, and wherein take up rolls feed said strands from said slitting means to said cube cutter means.

4. An apparatus for cubing as set forth in claim 3 wherein said cooling means includes a diverter having a plurality of jet openings therein for directing a plurality of air jets downwardly onto said strands as said strands are directed to said take up rolls, and means for supplying cooling air to said jet openings for flow therethrough.

5. An apparatus for the cubing of thermoplastic materials having support means, milling means mounted on said support means for masticating thermoplastic material into a hot thin sheet, a pair of rolls mounted on said support means, one of said rolls having a plurality of spaced formers cooperative with said other one of said rolls to form an undulating sheet having parallel strands interconnected by laterally extending and longitudinally extending web portions, said formers comprise a plurality of axially spaced cylinders with grooves therein, said cylinders having a small clearance space between adjacent cylinders, a plurality of laterally spaced filler members projecting into said clearance spaces between said adjacent cylinders, a slitting means having a plurality of laterally spaced knives cooperative with said one roll to slit said undulating material along said longitudinally extending web portions to form individual strands, a cube cutter means mounted downstream of said slitting means for cutting said strands along said laterally spaced webs into cubes, cooling means mounted between said cube cutter means and said slitting means for cooling said strands, said cooling means comprises a diverter located above said slitter for directing said parallel strands to said slitting means, said diverter having a plurality of jet openings therein for directing coolant downward onto said strands of material as it passes from said slitting means to said cube cutter means.

* * * * *